(12) United States Patent
Kogiso (10) Patent No.: US 10,089,558 B2
(45) Date of Patent: *Oct. 2, 2018

(54) IMAGE FORMING SYSTEM AND IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yoshiki Kogiso, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,488

(22) Filed: Dec. 1, 2017

(65) Prior Publication Data

US 2018/0089544 A1 Mar. 29, 2018

Related U.S. Application Data (63) Continuation of application No. 15/006,313, filed on Jan. 26, 2016, now Pat. No. 9,870,523.

(51) Int. Cl.
*G06K 15/02* (2006.01)
*G06F 3/12* (2006.01)
*H04N 1/00* (2006.01)

(52) U.S. Cl.
CPC ......... *G06K 15/021* (2013.01); *G06F 3/1208* (2013.01); *G06F 3/1211* (2013.01); *H04N 1/00602* (2013.01); *H04N 2201/0082* (2013.01)

(58) Field of Classification Search
CPC combination set(s) only.
See application file for complete search history.

(56) References Cited

U.S. PATENT DOCUMENTS

2007/0263242 A1  11/2007  Takahashi
2014/0256393 A1  9/2014  Navarrete
(Continued)

FOREIGN PATENT DOCUMENTS

JP  2677968  7/1997

OTHER PUBLICATIONS

Non-Final Office Action for U.S. Appl. No. 15/006,313 dated Nov. 25, 2016, 18 Pages.

(Continued)

*Primary Examiner* — Helen Zong
(74) *Attorney, Agent, or Firm* — Amin, Turocy & Watson LLP (57) ABSTRACT

According to an embodiment, an image forming system comprises a terminal device and an image forming apparatus. The image forming apparatus is provided with an image forming section, a transfer section and a transfer bias applying section. The image forming section forms a toner image on a transfer belt. The transfer section transfers the toner image onto a medium. The transfer bias applying section applies transfer bias voltage to the transfer section. The terminal device is provided with a request receiving section and a bias voltage determination section. The request receiving section receives a print request of printing the image on at least one card arranged on a cardboard as media. The bias voltage determination section determines the transfer bias voltage according to the print request.

9 Claims, 7 Drawing Sheets

(56) References Cited

U.S. PATENT DOCUMENTS

2015/0296091 A1 10/2015 Atay et al.
2015/0317545 A1 11/2015 Miyahara et al.
2016/0154357 A1 6/2016 Naruse et al.

OTHER PUBLICATIONS

Final Office Action for U.S. Appl. No. 15/006,313 dated May 24, 2017, 16 Pages.

IMAGE FORMING SYSTEM AND IMAGE FORMING APPARATUS

CROSS-REFERENCE TO RELATED APPLICATIONS

This application is a Continuation of application Ser. No. 15/006,313 filed on Jan. 26, 2016, the entire contents of which are incorporated herein by reference.

FIELD

Embodiments described herein relate generally to an image forming system and an image forming apparatus.

BACKGROUND

In a case in which an image is printed on a card with a smaller size than a sheet for printing, after the image is printed on a medium serving as origin of a card, the medium is cut to form the card. An image forming apparatus that includes a cutting machine and a cutting function or a card-dedicated image forming apparatus is used for the cutting conforming to the size of the card. There is a method to print an image on a card with an image forming apparatus that is being popular in general instead of the apparatus. Through this method, each cardboard arranged with the card is conveyed to the image forming apparatus and the card is printed by the image forming apparatus. However, in a case in which each cardboard with the card is conveyed, the cardboard or the card is thicker than a sheet for printing, and thus there is a problem that the print quantity on the card is unstable.

DETAILED DESCRIPTION

In accordance with an embodiment, an image forming system comprises a terminal device and an image forming apparatus. The image forming apparatus is provided with an image forming section, a transfer section and a transfer bias applying section. The image forming section forms a toner image on a transfer belt. The transfer section transfers the toner image onto a medium. The transfer bias applying section applies transfer bias voltage to the transfer section. The terminal device is provided with a request receiving section and a bias voltage determination section. The request receiving section receives a print request of printing the image on at least one card arranged on a cardboard as media. The bias voltage determination section determines the transfer bias voltage according to the print request.

The image forming system and the image forming apparatus of the embodiment are described with reference to the accompanying drawings hereinafter. The same components in each figure are applied with the same reference numerals and the repeated description about the same components is omitted.

Figure 1:
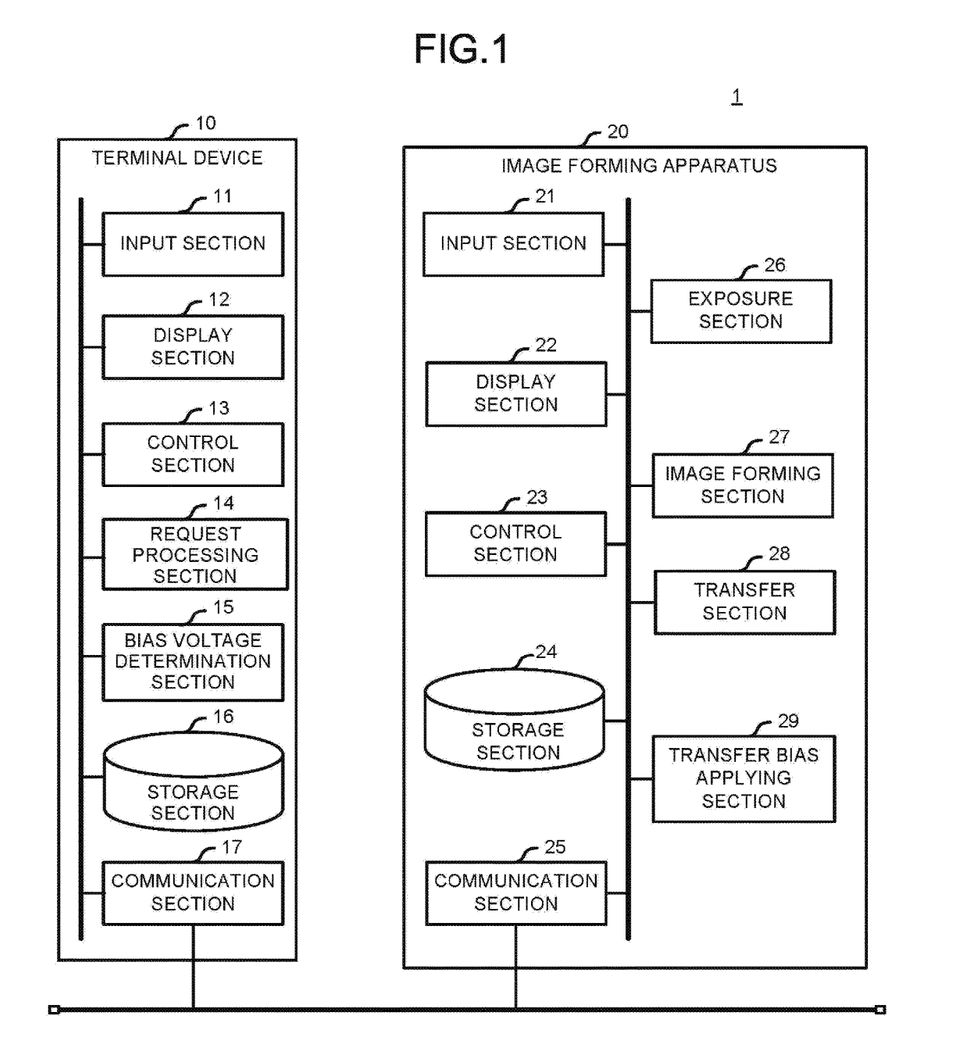
FIG. 1 is a diagram illustrating the structure of an image forming system according to an embodiment.

FIG. 1 is a diagram illustrating the structure of an image forming system 1 according to the embodiment. The image forming system 1 is provided with at least one terminal device 10 and at least one image forming apparatus 20. Though FIG. 1 shows one terminal device 10 and one image forming apparatus 20, the number of the terminal devices 10 and that of the image forming apparatuses 20 may respectively be more than one. The terminal device 10 and the image forming apparatus 20 are connected with each other in a communicable manner.

The terminal device 10 receives an operation of a user to request the image forming apparatus 20 to print image information that contains one or both of a document and an image. In a case in which a card is an object to be printed with the image information, the terminal device 10 acquires material and thickness of a card, material and thickness of a cardboard used for printing and the number of cards. The terminal device 10 controls the image forming apparatus 20 at the time of the printing of the image on the card on the basis of the acquired information. The terminal device 10 is, for example, a desktop computer, a notebook computer or a tablet computer, a smart phone and the like.

The terminal device 10 is provided with an input section 11, a display section 12, a control section 13, a request processing section 14, a bias voltage determination section 15, a storage section 16 and a communication section 17.

The input section 11 includes an input device, for example, a keyboard, a mouse, a touch panel and the like. The input section 11 inputs information corresponding to an operation of a user. The display section 12 presents the information to the user. The control section 13 that includes a CPU and a memory executes various kinds of information processing by executing programs stored in the storage section 16.

The request processing section 14 acquires information relating to a printing on a card with a cardboard through the input section 11. The request processing section 14 generates a print request for the printing on the card according to the acquired information. The request processing section 14 outputs the print request to the communication section 17 and enables the communication section 17 to send the print request to the image forming apparatus 20. The bias voltage determination section 15 determines secondary transfer bias voltage at the time an image is printed on the card on the basis of the information acquired by the request processing section 14.

The storage section 16 includes a non-temporary storage medium. The storage section 16 is constituted by, for example, a hard disk, a non-volatile ROM and a flash memory. The storage section 16 stores the program executed by the control section 13. The storage section 16 stores a combination table used by the request processing section 14. Further, the storage section 16 stores a voltage table used by the bias voltage determination section 15. The communication section 17 sends the information input from the control section 13 or the request processing section 14 to the image forming apparatus 20.

The combination table stores a plurality of combinations of material and thicknesses of user-selectable cards and cardboard. The voltage table stores a conveyance speed and secondary transfer bias voltage for each combination of material and thickness of the cardboard, material and thickness of the card and the number of cards. The conveyance speed refers to a speed at which the cardboard arranged with the card is conveyed when the image forming apparatus 20 prints the image on the card. The secondary transfer bias voltage refers to the voltage applied to the transfer section when the toner image formed inside the image forming apparatus 20 is transferred onto the surface of the card. Further, the secondary transfer bias voltage refers to voltage with which a value of current flowing per unit area of the card serving as a print object becomes a current value needed to transfer the toner image in the transfer section. The current flowing in card is called transfer current in the transfer section. The conveyance speed and the secondary transfer bias voltage associated with each combination are defined by an experiment or a simulation with the image forming apparatus 20 actually.

The image forming apparatus 20 is provided with an input section 21, a display section 22, a control section 23, a storage section 24, a communication section 25, an exposure section 26, an image forming section 27, a transfer section 28 and a transfer bias applying section 29.

The input section 21 inputs the information corresponding to the operation of the user. The input section 21 includes an input device, for example, a keyboard, a touch panel and the like. The display section 22 displays the information for the user. In the display section 22, for example, a liquid crystal display panel is used. A touch panel or a touch screen that combines a display device with the input device may be used in the input section 21 and the display section 22.

The control section 23 that includes the CPU and the memory executes various control processing by executing the programs stored in the storage section 24. For example, the control section 23 controls each section of the image forming apparatus 20 in response to the print request received from the terminal device 10 to enable the image to be printed on the medium such as a sheet or a card. The storage section 24 includes a non-temporary storage medium. The storage section 24 is constituted by, for example, a hard disk, a non-volatile ROM and a flash memory. The communication section 25 outputs the print request received from the terminal device 10 to the control section 23.

The exposure section 26 emits laser light to a photoconductive drum arranged in the image forming section 27 according to the control of the control section 23. The exposure section 26 develops an electrostatic latent image on the surface of the photoconductive drum. The image forming section 27 develops the electrostatic latent image on the surface of the photoconductive drum with toner to form a toner image. The transfer section 28 transfers the toner image formed by the image forming section 27 onto the surface of the medium. The transfer bias applying section 29 applies the secondary transfer bias voltage to the transfer section 28. The secondary transfer bias voltage is determined according to the transfer current in the transfer section 28 at the time the toner image is transferred onto the surface of the medium. The secondary transfer bias voltage is notified from the terminal device 10.

Figure 2:
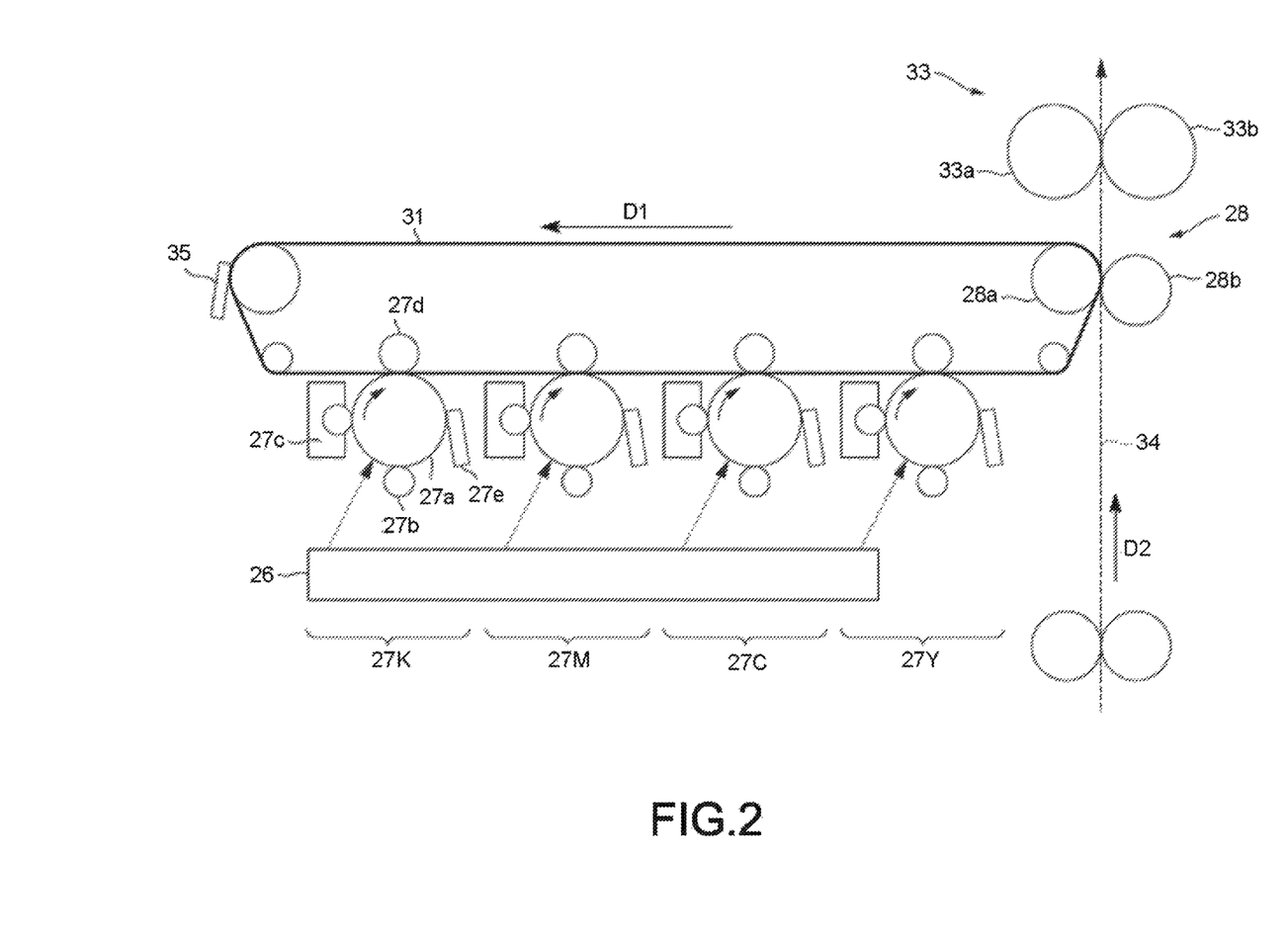
FIG. 2 is a diagram exemplifying the structure relating to the formation and transfer process of an image in the image forming apparatus.

FIG. 2 is a diagram exemplifying the structure relating to the formation and transfer process of an image in the image forming apparatus 20 of the embodiment. The structure shown in FIG. 2 is the structure of the image forming apparatus 20 that carries out a color printing. The image forming section 27 consists of four image forming sections containing image forming sections 27K, 27M, 27C and 27Y. Each of the image forming sections 27K, 27M, 27C and 27Y forms a toner image to be transferred onto medium. Each of the image forming sections 27K, 27M, 27C and 27Y includes a photoconductive drum 27a, a charging device 27b, a developing device 27c, a primary transfer roller 27d and a photoconductor cleaner 27e.

The photoconductive drum 27a rotates in a clockwise direction. The outer peripheral surface of the photoconductive drum 27a is charged by the charging device 27b. The charged outer peripheral surface of the photoconductive drum 27a is exposed by the laser light emitted from the exposure section 26. Through the exposure, the electrostatic latent image is formed on the outer peripheral surface of the photoconductive drum 27a. If the electrostatic latent image on the outer peripheral surface passes through the developing device 27c through the rotation of the photoconductive drum 27a, the toner image is developed by the developing device 27c.

The toner image on the outer peripheral surface of the photoconductive drum 27a is transferred onto the surface of an intermediate transfer belt 31 at a primary transfer area. The primary transfer area consists of the photoconductive drum 27a, the primary transfer roller 27d arranged to be opposite to the photoconductive drum 27a and the intermediate transfer belt 31. The primary transfer roller 27d is arranged at a position where the intermediate transfer belt 31 is sandwiched between the photoconductive drum 27a and the primary transfer roller 27d. Primary transfer bias voltage is applied to the primary transfer roller 27d, and the transfer current flows between the primary transfer roller 27d and the photoconductive drum 27a. The toner image on the outer peripheral surface of the photoconductive drum 27a is transferred to the intermediate transfer belt 31 under the effect of the transfer current.

The toner that remains on the outer peripheral surface of the photoconductive drum 27a without being transferred to the intermediate transfer belt 31 is removed by the photoconductor cleaner 27e. The foregoing processing is carried out repeatedly on the outer peripheral surface of the photoconductive drum 27a.

The image forming sections 27K, 27M, 27C and 27Y respectively have the same structure and transfer toner images to the intermediate transfer belt 31 except that the following point that differs in the image forming sections 27K, 27M, 27C and 27Y is the color of toner used to develop a toner image in the developing device 27c. In the developing devices 27c of the image forming sections 27K, 27M, 27C and 27Y, black toner, magenta toner, cyan toner and yellow toner are respectively used.

The surface of the intermediate transfer belt 31 passes through the image forming sections 27K, 27M, 27C and 27Y through the rotation of the intermediate transfer belt 31 in a rotational direction D1. As the intermediate transfer belt 31 passes through each of the image forming sections 27K, 27M, 27C and 27Y, a toner image with colors is formed on the surface of the intermediate transfer belt 31. The toner image with colors formed on the surface of the intermediate transfer belt 31 advances towards the transfer section 28 through the rotation of the intermediate transfer belt 31.

The conveyed medium is conveyed in a conveyance direction D2 towards the transfer section 28 in a conveyance path 34 through resist rollers 32a and 32b. Further, the medium is conveyed in synchronization with the advancing of the toner image towards the transfer section 28. The medium is, for example, a printing paper or a cardboard on which a card is arranged.

The transfer section 28 comprises a secondary transfer roller 28a and an opposite roller 28b which are arranged to face each other. The secondary transfer roller 28a and the opposite roller 28b are arranged at a position where the intermediate transfer belt 31 is sandwiched therebetween. The secondary transfer bias voltage is applied to the secondary transfer roller 28a by the transfer bias applying section 29. With the secondary transfer bias voltage applied, the transfer current flows between the secondary transfer roller 28a and the opposite roller 28b. The secondary transfer bias voltage is determined based on the medium and the intermediate transfer belt 31 sandwiched between the secondary transfer roller 28a and the opposite roller 28b.

The toner image is transferred onto the medium conveyed to the transfer section 28 by the resist rollers 32a and 32b at a secondary transfer area. The secondary transfer area consists of the intermediate transfer belt 31, the secondary transfer roller 28a and the opposite roller 28b. The medium passes through a nip area contacting with the intermediate transfer belt 31 at which the secondary transfer roller 28a and the opposite roller 28b face each other in synchronization with the rotation of the intermediate transfer belt 31. The toner image with colors formed on the surface of the intermediate transfer belt 31 is transferred onto the medium when the medium passes through the nip area under the function of the transfer current. The toner that remains on the surface of the intermediate transfer belt 31 without being transferred to the medium is removed from the intermediate transfer belt 31 with an intermediate transfer belt cleaner 35.

The medium onto which the toner image is transferred is conveyed to a fixing device 33. The fixing device 33 comprises a heat roller 33a and a pressure roller 33b. The heat roller 33a stores a heater therein. The outer peripheral surface of the heat roller 33a is heat by the heater. The pressure roller 33b is arranged at a position where the outer peripheral surface of the pressure roller 33b contacts with the outer peripheral surface of the heat roller 33a in a pressurized state. The fixing device 33 melts the toner image to fix it on the medium through heating and pressurizing a surface of the medium on which the toner image is transferred.

Figure 3:
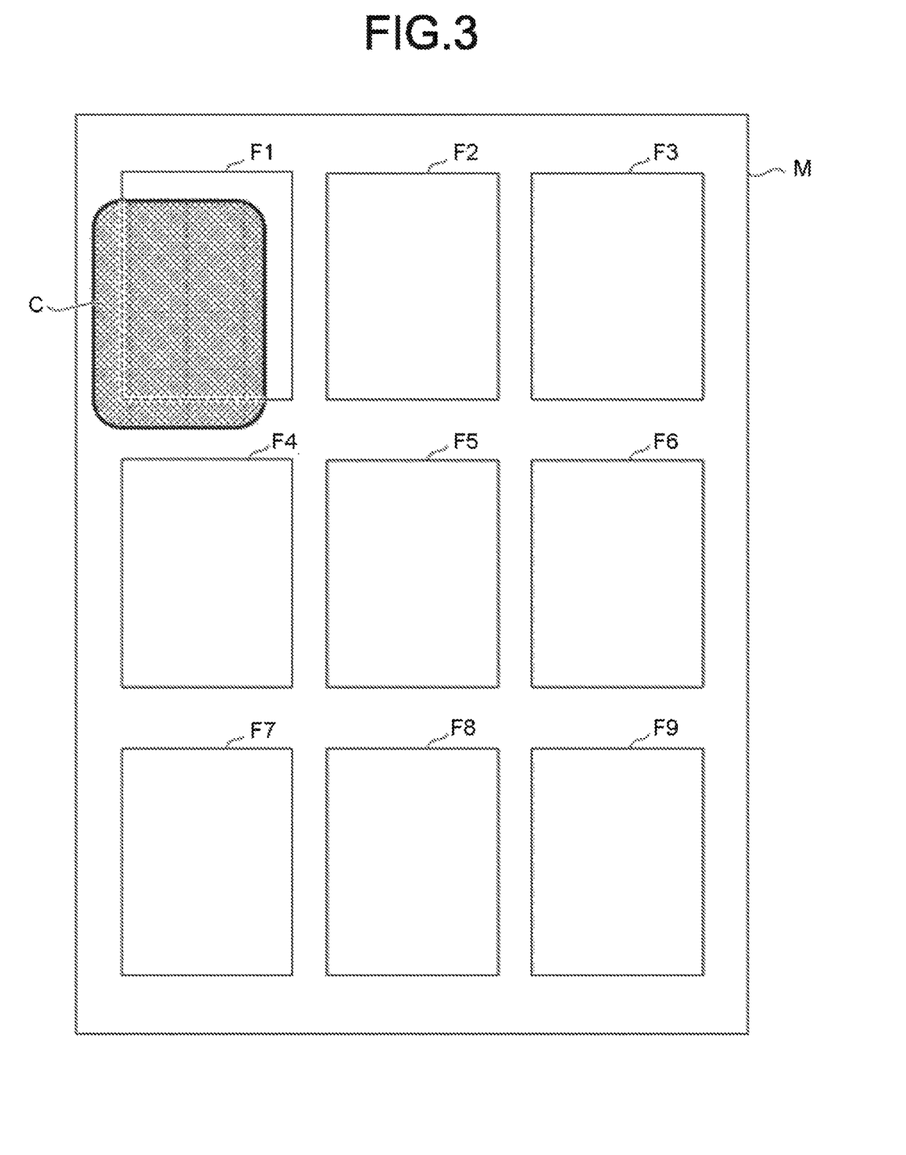
FIG. 3 is a diagram exemplifying a cardboard used for the printing of an image on a card in the image forming system.

FIG. 3 is a diagram exemplifying a cardboard M used for the printing of images on cards C in the image forming system 1 of the present embodiment. Areas F1-F9 conforming to sizes of the cards C to be printed with images are set in the cardboard M. At the areas F1-F9, frames or dents in which the cards C are inset are arranged. When the images are printed on the cards, the cardboard M where the cards C are inset in the areas F1-F9 is conveyed from a manual feed tray to the transfer section 28 of the image forming apparatus 20. The size of the card C inset on the cardboard M is determined by, for example, an ISO standard. A character indicating the size of the card C that can be inset may be printed on the cardboard M.

Figure 4:
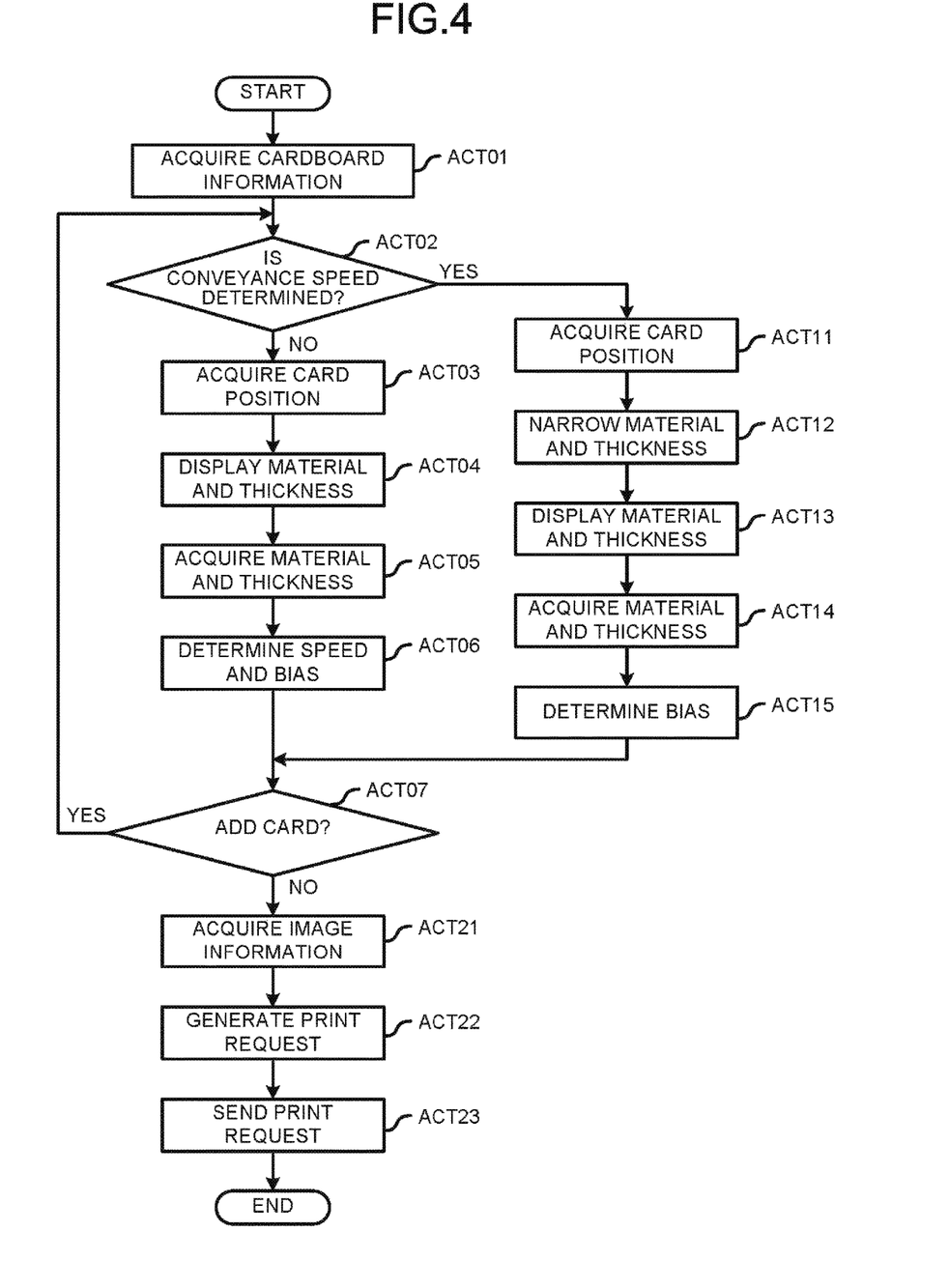
FIG. 4 is a flowchart illustrating the procedures carried out by a terminal device when instructing the image forming apparatus to print the image on the card.

FIG. 4 is a flowchart illustrating the procedures carried out by the terminal device 10 when instructing the image forming apparatus to print the image on the card in the present embodiment. In the terminal device 10, if the processing is started after the operation of the user is received, the request processing section 14 acquires cardboard information relating to the cardboard through the input section 11 (ACT 01). The cardboard information contains information indicating a size, a material and a thickness of the cardboard. Further, the cardboard information contains information indicating which one of a frame and a dent is arranged for fixing the card in the cardboard. The request processing section 14 enables the display section 12 to display an image indicating the shape of the cardboard shown in the acquired cardboard information. The image displayed on the display section 12 is, for example, a figure indicating the cardboard shown in FIG. 3.

Further, when the cardboard information is acquired, selectable candidates may be displayed on the display section 12 through the input section 11 that receives the operation of the user. The selectable candidates contain a plurality of combinations of sizes, material and thicknesses of the cardboard that can be selected by the user. The selectable candidates are stored as the combination table stored in the storage section 16. The request processing section 14 reads out the candidates from the storage section 16 to enable the display section 12 to display the candidates. The user may select one of the candidates displayed on the display section 12 to input cardboard information to the terminal device 10.

Figure 5:
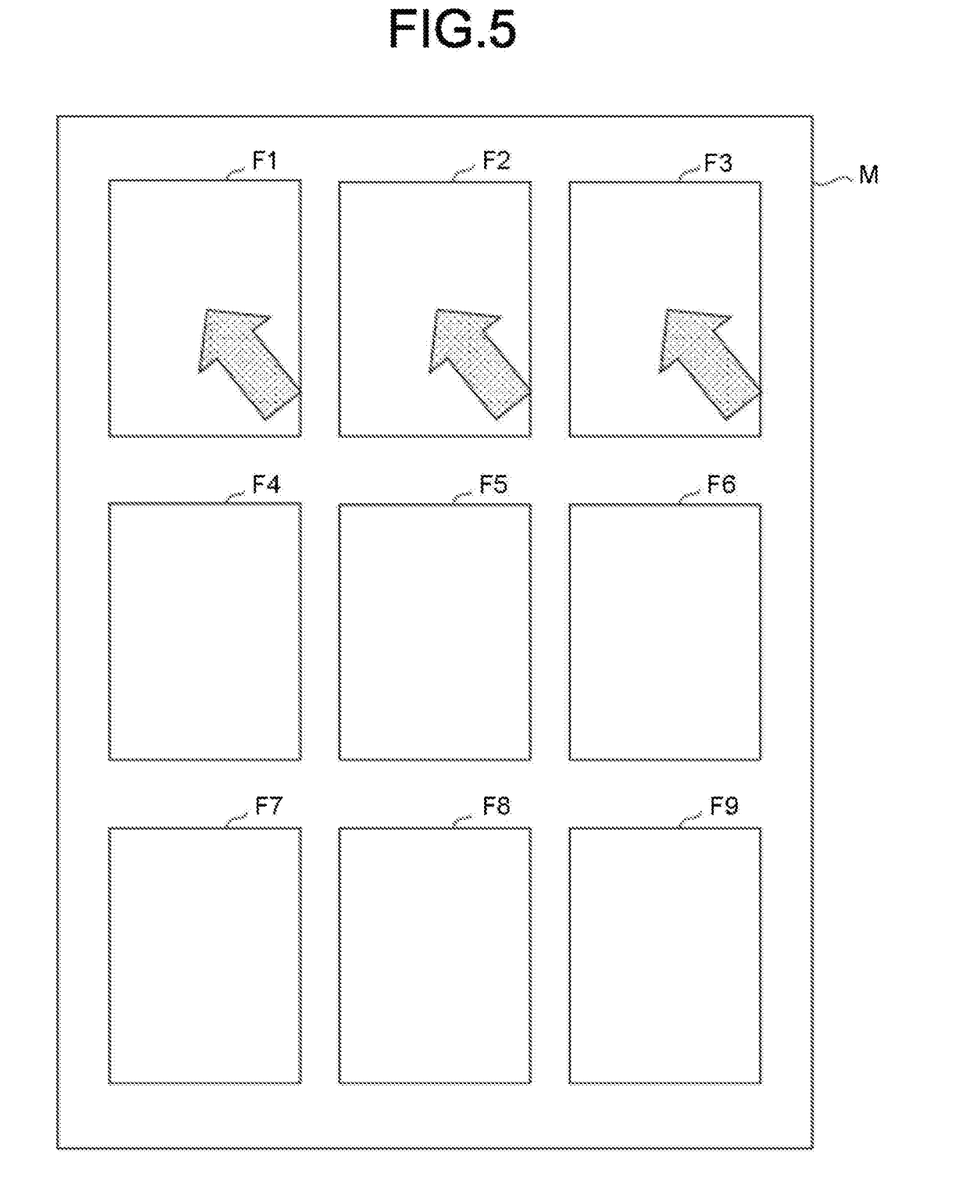
FIG. 5 is a diagram illustrating a display example at the time of selecting a position of the arrangement of the card on the cardboard.

The request processing section 14 determines whether or not the conveyance speed of the cardboard is determined in the image forming apparatus 20 (ACT 02). In a case in which the conveyance speed is not determined (NO in ACT 02), the request processing section 14 acquires a position at which the card is arranged on the cardboard through the input section 11 (ACT 03). The position at which the card is arranged is obtained as the information indicating, for example, an area selected by the user from the areas F1-F9 shown in FIG. 3. FIG. 5 is a diagram illustrating a display example when the position at which the card is arranged on the cardboard is selected. In areas F1-F3 selected by the user, arrows indicating that the three areas are selected are displayed. In an area selected by the user, a figure (e.g. arrow, etc.) indicating that the area is selected is displayed. In the display example of FIG. 5, through the selection of the three areas, information that the number of cards to be printed with the image is three is acquired. In other words, information that the number of cards which simultaneously pass through the transfer section is three is acquired.

Next, the request processing section 14 reads out the combination table from the storage section 16. The request processing section 14 enables the display section 12 to display a plurality of combinations of material and thicknesses of cards stored in the combination table (ACT 04). The request processing section 14 acquires the material and the thickness of the card selected by the user through the input section 11 (ACT 05). The bias voltage determination section 15 determines the conveyance speed and the secondary transfer bias voltage according to the acquired cardboard information and the material, the thickness and the position of the card (ACT 06). The conveyance speed and the secondary transfer bias voltage is determined by the bias voltage determination section 15 with the use of the voltage table stored in the storage section 16. Specifically, the conveyance speed and the secondary transfer bias voltage are read out in association with a combination of the material and thicknesses of the cardboard and the card and the number of the cards. The request processing section 14 proceeds to the processing in ACT 07 if the conveyance speed and the secondary transfer bias voltage are determined.

In the determination of ACT 02, in a case in which the conveyance speed is determined (YES in ACT 02), the request processing section 14 enables the display section 12 to display selectable positions. The request processing section 14 acquires a position selected by the user from the selectable positions through the input section 11 (ACT 11).

Figure 6:
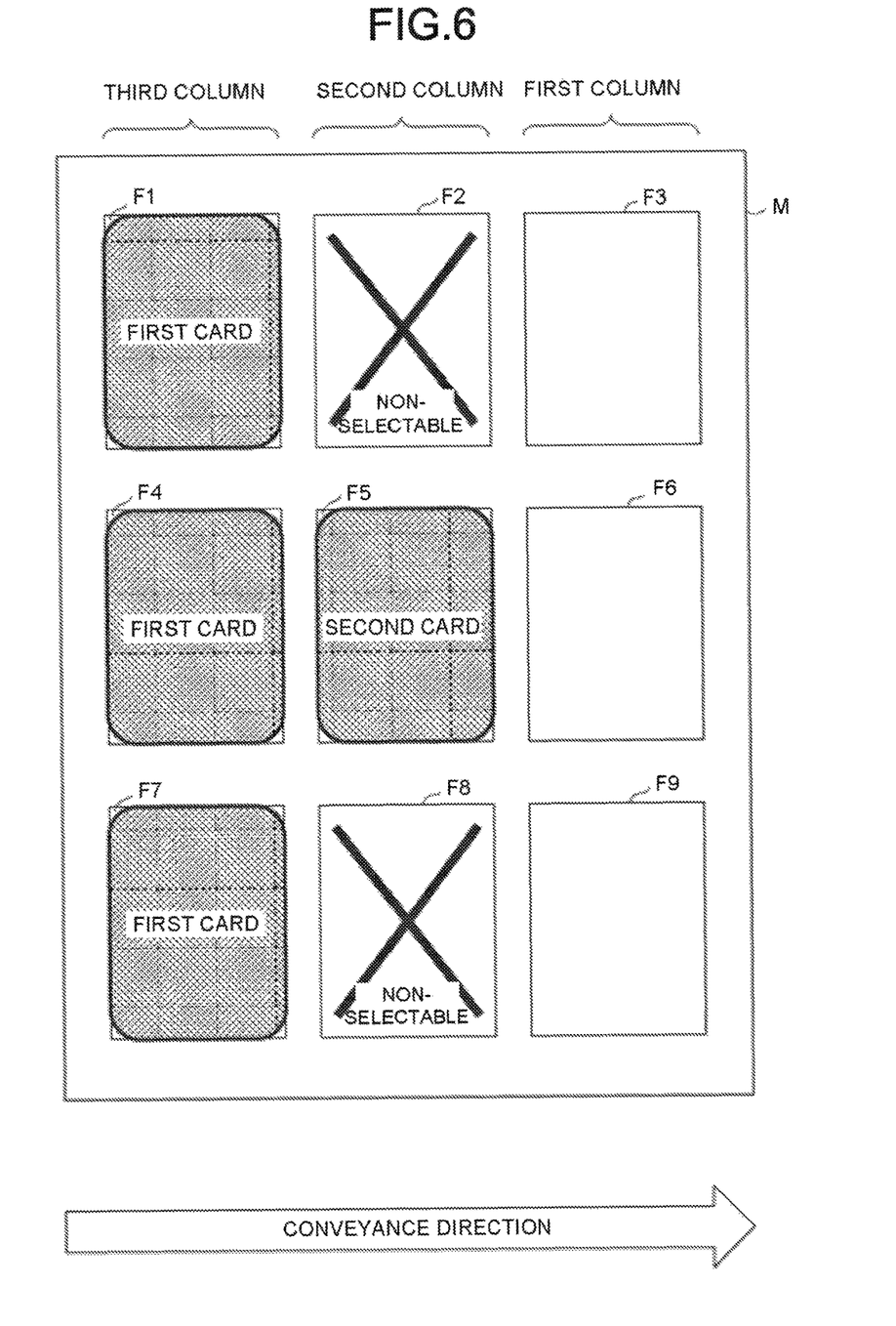
FIG. 6 is a diagram illustrating a display example indicating a selectable position on the cardboard presented to the user.

FIG. 6 is a diagram illustrating a display example indicating selectable positions on the cardboard presented to the user. In the display example shown in FIG. 6, the selectable positions are displayed after positions at which three first cards are arranged and a position at which one second card is arranged are selected. The arrangement of the first cards is selected in the areas F1, F4, and F7. The arrangement of the second card is selected in the area F5.

In the display example shown in FIG. 6, the areas F3, F6 and F9 of the first column become selectable. Though no arrangement of the card is selected in the areas F2 and F8, the user cannot select the areas F2 and F8. This is because that the same cards in the material and the thickness are arranged in a direction vertical to the conveyance direction of the cardboard in the image forming apparatus 20. If one or both of the material and the thickness among cards differ, resistance values of the cards differ. As the cards arranged in the direction vertical to the conveyance direction pass through the secondary transfer area at the same time, if the resistance values of the cards vary, the control on the transfer current becomes difficult. Thus, the areas F2 and F8 cannot be selected because the cards with different material and thicknesses are not arranged at a column where a card has been arranged.

If the position where the card is arranged is acquired, the request processing section 14 reads out the combination table from the storage section 16. The request processing section 14 narrows a plurality of combinations of material, thicknesses and number of the cards stored in the combination table according to the conveyance speed (ACT 12). Through the narrowing operation, a combination containing the conveyance speed determined already is extracted from the combinations stored in the combination table. The extracted combination refers to the combination of the material and the thickness of the card that can be printed without the change of the conveyance speed determined according to the card arranged already on the cardboard. In the image forming apparatus 20, if the conveyance speed is changed in the conveyance process of the medium, the medium is damaged and print quantity is reduced, in some cases. Thus, the request processing section 14 narrows the combinations of the cards on which the printing can be carried out without changing the conveyance speed.

The request processing section 14 enables the display section 12 to display the extracted combination among a plurality of combinations of material and thicknesses of cards in the combination table (ACT 13). The request processing section 14 acquires the material and the thickness of the card selected by the user through the input section 11 (ACT 14). The bias voltage determination section 15 determines the secondary transfer bias voltage according to acquired cardboard information and the material, the thickness and the position of the card (ACT 15). If the secondary transfer bias voltage at the row where the card is arranged is determined, the request processing section 14 proceeds to the processing in ACT 07.

The request processing section 14 determines whether or not the instruction of the user input through the input section 11 is an instruction used to add cards to be arranged on the cardboard (ACT 07). In a case in which the instruction is used to add the cards (YES in ACT 07), the request processing section 14 returns to the processing in ACT 02.

In a case in which the instruction is not used to add the cards (NO in ACT 07), the request processing section 14 acquires the image information from the storage section 16 (ACT 21). The image information indicates an image to be printed on the card. The image information stored in the storage section 16 is created by software executed by the terminal device 10 or created by other device. The size of the image indicated by the image information may be larger or smaller than that of the card serving the print object. In a case in which the size of the image is larger than that of the card, the user can select either the printing of the image even on the cardboard or the reduction of the size of the image. Further, the image information is selected by the user for each area where the selected card is arranged on the cardboard.

The request processing section 14 generates the print request (ACT 22). The print request refers to information that contains image information printed on each position selected on the cardboard, the conveyance speed of the cardboard and the secondary transfer bias voltage of each column on the cardboard. The request processing section 14 enables the communication section 17 to send the print request to the image forming apparatus 20 (ACT 23). After the print request is sent to the image forming apparatus 20, a series of operations is ended.

The print request sent to the image forming apparatus 20 is received by the control section 23 through the communication section 25. The control section 23 enables the exposure section 26 and the image forming section 27 to form the toner image on the basis of the image information contained in the print request. The control section 23 notifies the transfer bias applying section 29 of the secondary transfer bias voltage contained in the print request. Further, the control section 23 controls each section in the image forming apparatus 20 on the basis of the conveyance speed contained in the print request.

Figure 7:
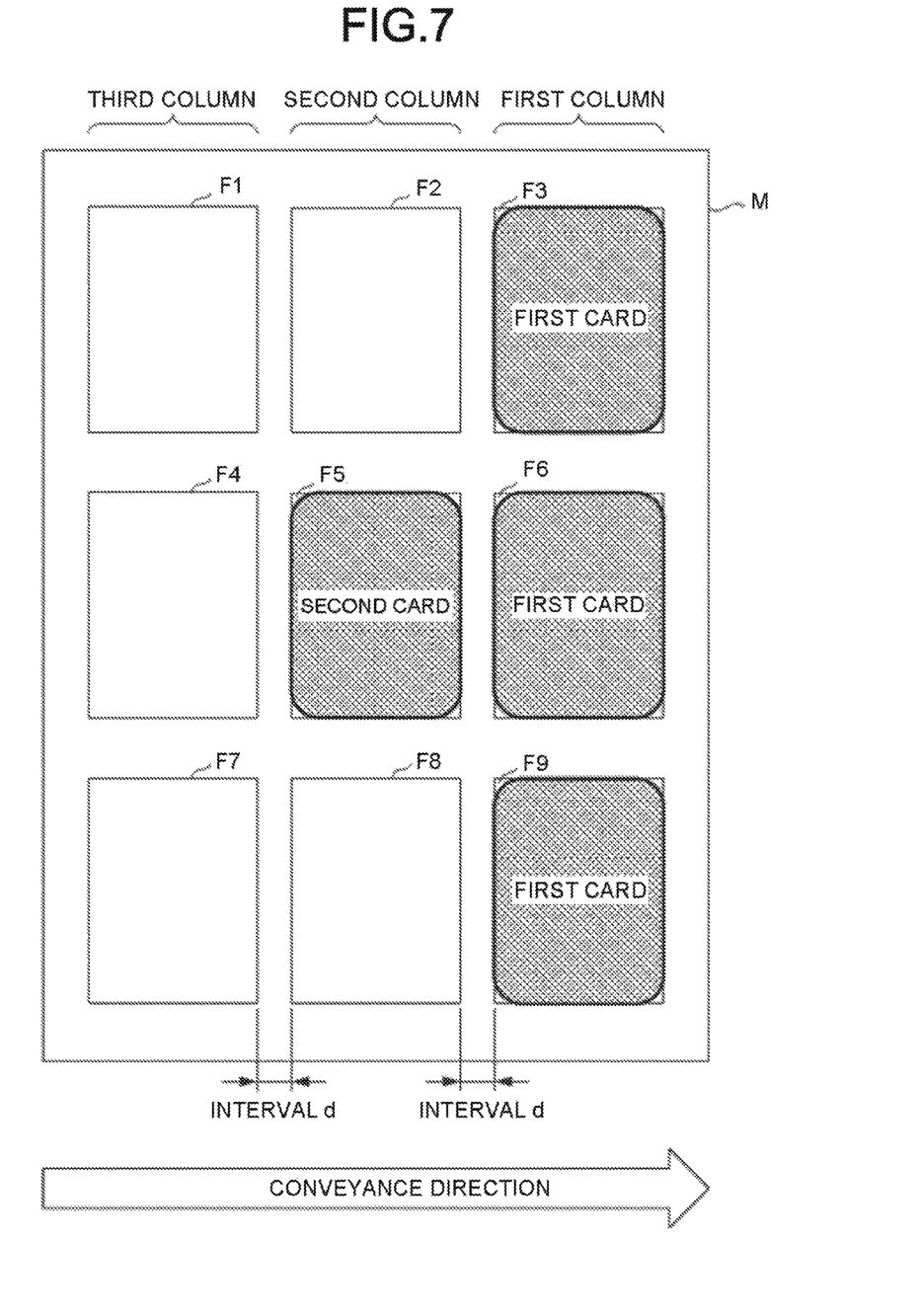
FIG. 7 is a diagram illustrating an interval between areas where cards on the cardboard are arranged.

Hereinafter, intervals between areas where the cards on the cardboard are arranged are described. FIG. 7 is a diagram exemplifying intervals between the areas F1-F9 where the cards on the cardboard M are arranged. An interval d between the first column and the second column and that between the second column and the third column of each area perpendicular to the conveying direction of the cardboard in the image forming apparatus 20 is determined as described below. During the generation of the print request for instructing the printing of the image on the card, the material and the thickness of the card are selected to make the conveyance speed unchanged through the processing in ACT 12. However, the secondary transfer bias voltage is changed according to the material and the thickness of the selected card. That is, in the image forming apparatus 20, there is a case in which the secondary transfer bias voltage of each column on the cardboard changes. Thus, the interval d of each column on the cardboard is determined on the basis of the time needed when the secondary transfer bias voltage changes from maximum allowable value to minimum allowable value for the secondary transfer bias or from the minimum value that can be acquired to the maximum value that can be acquired for the secondary transfer bias. Specifically, the interval d is a distance longer than the distance obtained by multiplying the maximum value of the conveyance speed in the image forming apparatus 20 by the time needed for the change of the secondary transfer bias voltage.

According to the image forming system 1 of the embodiment, the bias voltage determination section 15 determines the secondary transfer bias voltage according to the material and the thickness of each of the card and the cardboard. The determined secondary transfer bias voltage is voltage with which the transfer current required for the transfer of the toner image can be obtained, and thus the print quantity on the card can be stable.

In the foregoing embodiment, it is described that the secondary transfer bias voltage is stored in the voltage table. However, a difference value or coefficient to the secondary transfer bias voltage serving as a reference voltage may be stored in the voltage table. In a case in which the difference value is stored, the bias voltage determination section 15 or the control section 23 carries out the addition or subtraction of the secondary transfer bias voltage serving as the reference voltage and the difference value. The bias voltage determination section 15 or the control section 23 sets the addition result and the subtraction result as the secondary transfer bias voltage of the printing on the card. Further, in a case in which the coefficient is stored, the bias voltage determination section 15 or the control section 23 multiplies the secondary transfer bias voltage serving as the reference voltage by the coefficient. The bias voltage determination section 15 or the control section 23 sets the multiplication result as the secondary transfer bias voltage of the printing on the card. The secondary transfer bias voltage serving as the reference voltage is, for example, secondary transfer bias voltage used for a normal printing paper.

In the foregoing embodiment, it is described that the print request is generated in the terminal device 10. However, it may be applicable that the image forming apparatus 20 includes the request processing section 14, the bias voltage determination section 15 and the storage section 16. In this case, without using the terminal device 10, the image forming apparatus 20 can make the print quantity on the card stable.

Further, the image forming apparatus 20 may include the bias voltage determination section 15 and the storage section 16. In this case, the image forming apparatus 20 receives information relating to the material and the thickness of each of the cardboard and the card acquired by the terminal device 10 from the terminal device 10. In the image forming apparatus 20, the bias voltage determination section 15 may determine the secondary transfer bias voltage and the conveyance speed according to the information received from the terminal device 10.

In the foregoing embodiment, it is described that the terminal device 10 includes the request processing section 14 and the bias voltage determination section 15. However, the control section 13 may execute the programs to operate as the request processing section 14 and the bias voltage determination section 15.

In the foregoing embodiment, it is described that the bias voltage determination section 15 determines the secondary transfer bias voltage according to the combination of the material and thickness of each of the card and the cardboard. However, in a case in which the change in the print quantity is small no matter how the material and the thickness of the cardboard change, the bias voltage determination section 15 may not use the information of material and the thickness of the cardboard. That is, the bias voltage determination section 15 may determine the secondary transfer bias voltage according to the material and the thickness of the card.

In the foregoing embodiment, it is described that the bias voltage determination section 15 determines the conveyance speed and the secondary transfer bias voltage. However, the terminal device 10 may include a speed determination section for determining the conveyance speed, and the bias voltage determination section 15 may determine the secondary transfer bias voltage. In this case, the speed determination section determines the conveyance speed with the use of the voltage table similarly to the bias voltage determination section 15.

In the foregoing embodiment, it is described that the image forming apparatus 20 prints a colorful image on the medium. However, the image forming apparatus 20 may print a monochromatic image or an image with two colors on the medium.

According to at least one embodiment described above, the request processing section for receiving the print request of the printing which takes the cardboard and at least one card arranged on the cardboard as the media and the bias voltage determination section for determining the secondary transfer bias voltage based on the print request are provided to make the print quantity on the card stable.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming system, comprising:
   a terminal device and an image forming apparatus,
   wherein the image forming apparatus comprises:
      an image forming section configured to form a toner image on an intermediate transfer medium;
      a first roller and a second roller configured to sandwich the intermediate transfer medium and at least one card arranged on a cardboard to pressure the at least one card so as to transfer the toner image onto the at least one card;
      one or more memories that store one or more software components; and
      one or more processors configured to execute the one or more software components to perform at least:
         applying transfer bias voltage to the first and second roller, and
         determining a speed at which the cardboard and the at least one card arranged on the cardboard pass through between the first roller and the second roller,
   wherein the terminal device comprises:
      a request receiving section configured to receive a print request of printing the toner image on the at least one card arranged on the cardboard;
      a bias voltage determination section configured to determine the transfer bias voltage according to a combination of the at least one card and the cardboard and an arrangement of the at least one card on the cardboard,
   wherein the print request contains information indicating a material and a thickness of each of the cardboard and the at least one card, and
   wherein the one or more processors are further configured to perform determining the speed according to the material and the thickness of each of the cardboard and the at least one card.

2. The image forming system according to claim 1, wherein the bias voltage determination section determines the transfer bias voltage according to the material and the thickness of the at least one card.

3. The image forming system according to claim 1, wherein
the bias voltage determination section determines the transfer bias voltage according to the thickness of the cardboard, the thickness of the at least one card, the material of the cardboard and the material of the at least one card.

4. The image forming system according to claim 1, wherein
the bias voltage determination section determines the transfer bias according to a current value of current flowing in the at least one card when the at least one card passes through between the first roller and the second roller.

5. The image forming system according to claim 1,
wherein the at least one card comprises a plurality of cards,
wherein there is a case in which the plurality of cards is arranged on the cardboard and one or both of the material and the thickness of the plurality of cards differ,
wherein the one or more processors are further configured to perform determining the speed according to the material and the thickness of any one of the plurality of cards, and
wherein the bias voltage determination section determines the transfer bias voltage according to the speed, the thickness of the cardboard, the thickness of the plurality of cards, the material of the cardboard and the material of the plurality of cards.

6. The image forming system according to claim 1,
wherein the at least one card comprises a plurality of cards,
wherein in a case in which the plurality of cards is arranged along a direction in which the cardboard passes through between the first roller and the second roller, a certain interval is arranged between the plurality of cards, and
wherein the certain interval is determined according to maximum value that can be acquired for the speed and the time needed for the change of the transfer bias voltage.

7. The image forming system according to claim 1, wherein
the bias voltage determination section determines the transfer bias according to the number of the at least one card that passes through between the first roller and the second roller simultaneously.

8. An image forming system, comprising:
a terminal device and an image forming apparatus,
wherein the terminal device comprises:
a request receiving section configured to receive a print request of printing a toner image on at least one card arranged on a cardboard as a medium,
wherein the image forming apparatus comprises:
an image forming section configured to form the toner image on an intermediate transfer medium;
a first roller and a second roller configured to sandwich the intermediate transfer medium and at least one card arranged on a cardboard to pressure the at least one card so as to transfer the toner image onto the at least one card;
one or more memories that store one or more software components; and
one or more processors configured to execute the one or more software components to perform at least:
applying transfer bias voltage to the first and second roller,
determining a speed at which the cardboard and the at least one card arranged on the cardboard pass through between the first roller and the second roller, and
determining the transfer bias voltage according to the print request,
wherein the print request contains information indicating a material and a thickness of each of the cardboard and the at least one card, and
wherein the one or more processors are further configured to perform determining the speed according to the material and the thickness of each of the cardboard and the at least one card.

9. An image forming apparatus, comprising:
an image forming section configured to form a toner image on an intermediate transfer medium;
a first roller and a second roller configured to sandwich the intermediate transfer medium and at least one card arranged on a cardboard to pressure the at least one card so as to transfer the toner image onto the at least one card;
one or more memories that store one or more software components; and
one or more processors configured to execute the one or more software components to perform at least:
controlling transfer bias voltage applied to the first and second roller,
receiving a print request of printing the toner image on the at least one card arranged on a cardboard,
determining the transfer bias voltage according to the print request, and
determining a speed at which the cardboard and the at least one card arranged on the cardboard pass through between the first roller and the second roller,
wherein the print request contains information indicating a material and a thickness of each of the cardboard and the at least one card, and
wherein the one or more processors are further configured to perform determining the speed according to the material and the thickness of each of the cardboard and the at least one card.

* * * * *